(12) United States Patent
Khan et al.

(10) Patent No.: US 11,061,779 B2
(45) Date of Patent: Jul. 13, 2021

(54) SYSTEM AND METHOD FOR ORCHESTRATED BACKUP IN A VIRTUALIZED ENVIRONMENT

(71) Applicant: EMC IP Holding Company LLC, Hopkinton, MA (US)

(72) Inventors: Asif Khan, Bangalore (IN); Shelesh Chopra, Bangalore (IN); Matthew Dickey Buchman, Seattle, WA (US); Krishnendu Bagchi, Bangalore (IN); Ravi Shankar, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 276 days.

(21) Appl. No.: 16/031,261

(22) Filed: Jul. 10, 2018

(65) Prior Publication Data
US 2020/0019469 A1 Jan. 16, 2020

(51) Int. Cl.
*G06F 16/00* (2019.01)
*G06F 11/14* (2006.01)
*G06F 16/188* (2019.01)
*G06F 16/182* (2019.01)
*G06F 9/455* (2018.01)

(52) U.S. Cl.
CPC ........ *G06F 11/1461* (2013.01); *G06F 16/182* (2019.01); *G06F 16/188* (2019.01); *G06F 9/45558* (2013.01); *G06F 11/1464* (2013.01); *G06F 2009/4557* (2013.01); *G06F 2009/45583* (2013.01); *G06F 2009/45595* (2013.01); *G06F 2201/815* (2013.01)

(58) Field of Classification Search
CPC ............. G06F 11/1461; G06F 11/1464; G06F 9/45558; G06F 2009/4557; G06F 2009/45583; G06F 2009/45595; G06F 2201/815; G06F 16/188; G06F 16/192; G06F 16/196; G06F 16/182; G06F 16/1824; G06F 16/1827; G06F 16/184; G06F 16/1844; G06F 16/1847
USPC .................................................. 707/600–899
See application file for complete search history.

(56) References Cited

U.S. PATENT DOCUMENTS

| | | | |
|---|---|---|---|
| 6,529,995 B1 * | 3/2003 | Shepherd | G06F 11/1435 707/999.202 |
| 9,300,693 B1 * | 3/2016 | Manmohan | G06F 9/45558 |
| 9,977,704 B1 | 5/2018 | Chopra et al. | |

(Continued)

*Primary Examiner* — Michelle N Owyang
(74) *Attorney, Agent, or Firm* — Chamberlain, Hrdlicka, White, Williams & Aughtry

(57) ABSTRACT

An agent for managing virtual machines includes a persistent storage and an application agent manager. The persistent storage stores backup policies. The application agent manager identifies a new virtual machine instance and, in response to identifying the new virtual machine instance, performs proxy agent based analysis of the new virtual machine instance to generate a data loss threat profile of the new virtual machine instance; remediates the new virtual machine instance by instantiating application agents for the new virtual machine instance based on the data loss threat profile and a portion of the backup policies associated with the new virtual machine instance; updates at least one of the backup policies based on the instantiated application agents; and performs an application backup session for the new virtual machine instance using the instantiated application agents.

19 Claims, 14 Drawing Sheets

(56) References Cited

U.S. PATENT DOCUMENTS

| | | | |
|---|---|---|---|
| 10,613,888 B1* | 4/2020 | Mentz | G06F 9/45558 |
| 2010/0153697 A1* | 6/2010 | Ford | G06F 21/31 |
| | | | 713/2 |
| 2011/0040812 A1* | 2/2011 | Phillips | G06F 9/45541 |
| | | | 707/822 |
| 2013/0262638 A1* | 10/2013 | Kumarasamy | G06F 15/177 |
| | | | 709/221 |
| 2014/0089500 A1* | 3/2014 | Sankar | H04L 47/125 |
| | | | 709/224 |
| 2014/0337285 A1* | 11/2014 | Gokhale | G06F 3/067 |
| | | | 707/610 |
| 2015/0317216 A1* | 11/2015 | Hsu | G06F 16/188 |
| | | | 707/679 |
| 2016/0203015 A1* | 7/2016 | Joshi | G06F 9/45558 |
| | | | 718/1 |
| 2017/0168903 A1* | 6/2017 | Dornemann | G06F 9/45558 |
| 2019/0354438 A1* | 11/2019 | Mohanta | G06F 3/0614 |

* cited by examiner

SYSTEM AND METHOD FOR ORCHESTRATED BACKUP IN A VIRTUALIZED ENVIRONMENT

BACKGROUND

Computing devices generate, use, and store data. The data may be, for example, images, documents, webpages, or meta-data associated with the data. The data may be stored on a persistent storage. Stored data may be deleted from the persistent storage.

A backup of the data stored on a computing device may be backed up by storing it on a second computing device. The second computing device may be geographically separated from the computing device.

SUMMARY

In one aspect, an agent for managing virtual machines in accordance with one or more embodiments of the invention includes a persistent storage and an application agent manager. The persistent storage stores backup policies. The application agent manager identifies a new virtual machine instance and, in response to identifying the new virtual machine instance, performs proxy agent based analysis of the new virtual machine instance to generate a data loss threat profile of the new virtual machine instance; remediates the new virtual machine instance by instantiating application agents for the new virtual machine instance based on the data loss threat profile and a portion of the backup policies associated with the new virtual machine instance; updates at least one of the backup policies based on the instantiated application agents; and performs an application backup session for the new virtual machine instance using the instantiated application agents.

In one aspect, a method for managing virtual machines in accordance with one or more embodiments of the invention includes identifying a new virtual machine instance of the virtual machines and, in response to identifying the new virtual machine instance, performing proxy agent based analysis of the new virtual machine instance to generate a data loss threat profile of the new virtual machine instance; remediating the new virtual machine instance by instantiating application agents for the new virtual machine instance based on the data loss threat profile and a portion of backup policies associated with the new virtual machine instance, wherein the backup policies are associated with the virtual machines; updating at least one of the backup policies based on the instantiated application agents; and performing an application backup session for the new virtual machine instance using the instantiated application agents.

In one aspect, a non-transitory computer readable medium in accordance with one or more embodiments of the invention includes computer readable program code, which when executed by a computer processor enables the computer processor to perform a method for managing virtual machines. The method includes identifying a new virtual machine instance of the virtual machines and, in response to identifying the new virtual machine instance, performing proxy agent based analysis of the new virtual machine instance to generate a data loss threat profile of the new virtual machine instance; remediating the new virtual machine instance by instantiating application agents for the new virtual machine instance based on the data loss threat profile and a portion of backup policies associated with the new virtual machine instance, wherein the backup policies are associated with the virtual machines; updating at least one of the backup policies based on the instantiated application agents; and performing an application backup session for the new virtual machine instance using the instantiated application agents.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

DETAILED DESCRIPTION

Specific embodiments will now be described with reference to the accompanying figures. In the following description, numerous details are set forth as examples of the invention. It will be understood by those skilled in the art that one or more embodiments of the present invention may be practiced without these specific details and that numerous variations or modifications may be possible without departing from the scope of the invention. Certain details known to those of ordinary skill in the art are omitted to avoid obscuring the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to systems, devices, and methods for providing services to virtual machines. More specifically, the systems, devices, and methods may provide backup and restoration services to virtual machines.

In one or more embodiments of the invention, the system may automatically instantiate executing components within the system to orchestrate the generation of backups of virtual machines, production hosts, applications, or other entities. By doing so, consistently generated backups that provide for continuous continuity chains may be generated. As will be discussed below, generation of backups that are unusable for restoration purposes may needless consume computing resources and prevent entities from being restored to desired states.

In one or more embodiments of the invention, the instantiated executing components may be based on data loss threat profiles of entities hosting the to-be-backed up entity. The data loss threat profiles may take into account the types of applications, quantities of applications, available components resources, and/or other characteristics of the hosting entities.

Thus, embodiments of the invention may provide an improved process for performing backup generations in a distributed environment that is more computing resource efficient than contemporary methods. Similarly, embodiments of the invention may improve the consistency of generated backups by based the generation on a data driven method of orchestration, as opposed to manual or other haphazard methods of generating backups.

Figure 1:
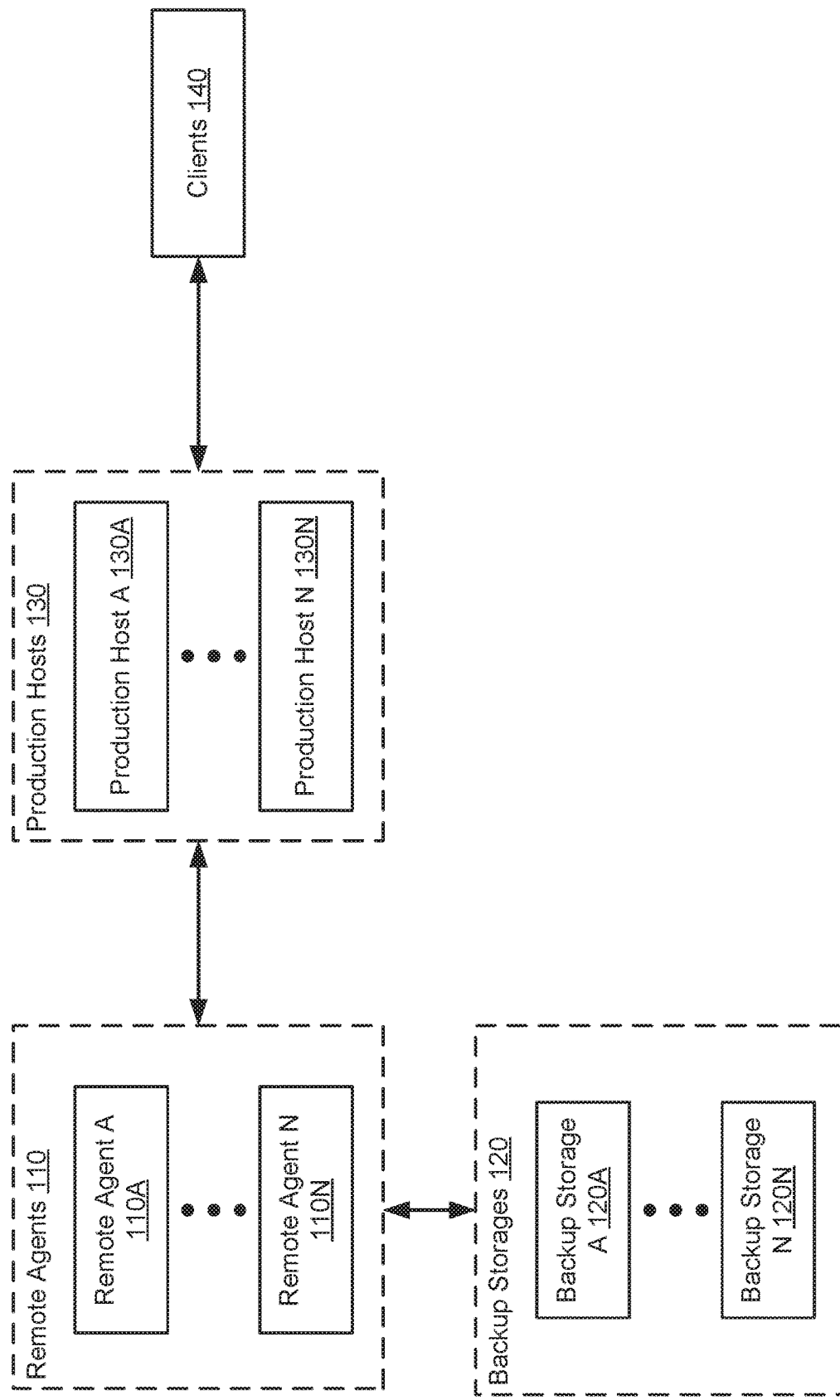
FIG. 1 shows a diagram of a system in accordance with one or more embodiments of the invention.

FIG. 1 shows an example system in accordance with one or more embodiments of the invention. The system may include production hosts (130) that host virtual machines exposed to clients (140). The system may further include remote agents (110) that provide services to the production hosts. The services may include data storage in backup storages (120) and restorations of virtual machines hosted by the production hosts (130) using the data stored in the backup storages (120). Before generating backups for the production hosts (130), the remote agents (110) may conduct a proxy, agent driven analysis of the production hosts and/or hosted virtual machines to determine a workflow for generating the backups. Doing so may improve the security, reliability, and efficiency of generating backups and providing restoration services. Each component of the system of FIG. 1 may be operably connected via any combination of wired and wireless connections. Each component of the system is discussed below.

The clients (140) may be computing devices. The computing devices may be, for example, mobile phones, tablet computers, laptop computers, desktop computers, servers, or cloud resources. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The clients (140) may be other types of computing devices without departing from the invention. For additional details regarding computing devices, See FIG. 8.

The clients (140) may interact with virtual machines hosted by the production hosts (130). For example, the virtual machines may host databases, email servers, or any other type of application. The clients (140) may utilize services provided by these or other applications. In another example, the clients (140) may directly operate the virtual machines, e.g., a virtualized environment. In such a scenario, the clients (140) may operate as terminals for accessing the virtual machines.

In one or more embodiments of the invention, the production hosts (130) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions described in this application. The production hosts (130) may be other types of computing devices without departing from the invention. For additional details regarding computing devices, See FIG. 8.

In one or more embodiments of the invention, the production hosts (130) are distributed computing devices. As used herein, a distributed computing device refers to functionality provided by a logical device that utilizes the computing resources of one or more separate and/or distinct computing devices. For example, in one or more embodiments of the invention, the production hosts (130) may be distributed devices that include components distributed across a number of separate and/or distinct computing devices. In such a scenario, the functionality of the production hosts (130) may be performed by multiple different computing devices without departing from the invention.

In one or more embodiments of the invention, the production hosts (130) host virtual machines. The production hosts (130) may host any number of virtual machines without departing from the invention. The production hosts (130) may also host agents, or other executing components, for orchestrating the operation of the hosted virtual machines.

In one or more embodiments of the invention, agents hosted by the production hosts (130) may be remotely controlled by remote agents (110). The remote controlled agents, e.g., production agents and/or proxy agents, may be local, i.e., executing using resources of the production hosts (130). The remote controlled agents may enable the remote agents to determine a data loss threat profile for productions hosts and/or hosted virtual machines before providing backup and/or restoration services to the production hosts (130). Doing so may enable a remote agent to determine a workflow for providing the backup/restoration services. As will be discussed below, by basing workflows for backup restoration services on data loss threat profiles, consistent backups for all production hosts may be generated that enable restorations to be performed thereby improving the reliability of virtual machines, production hosts, and the distributed system of FIG. 1.

Figure 6A:
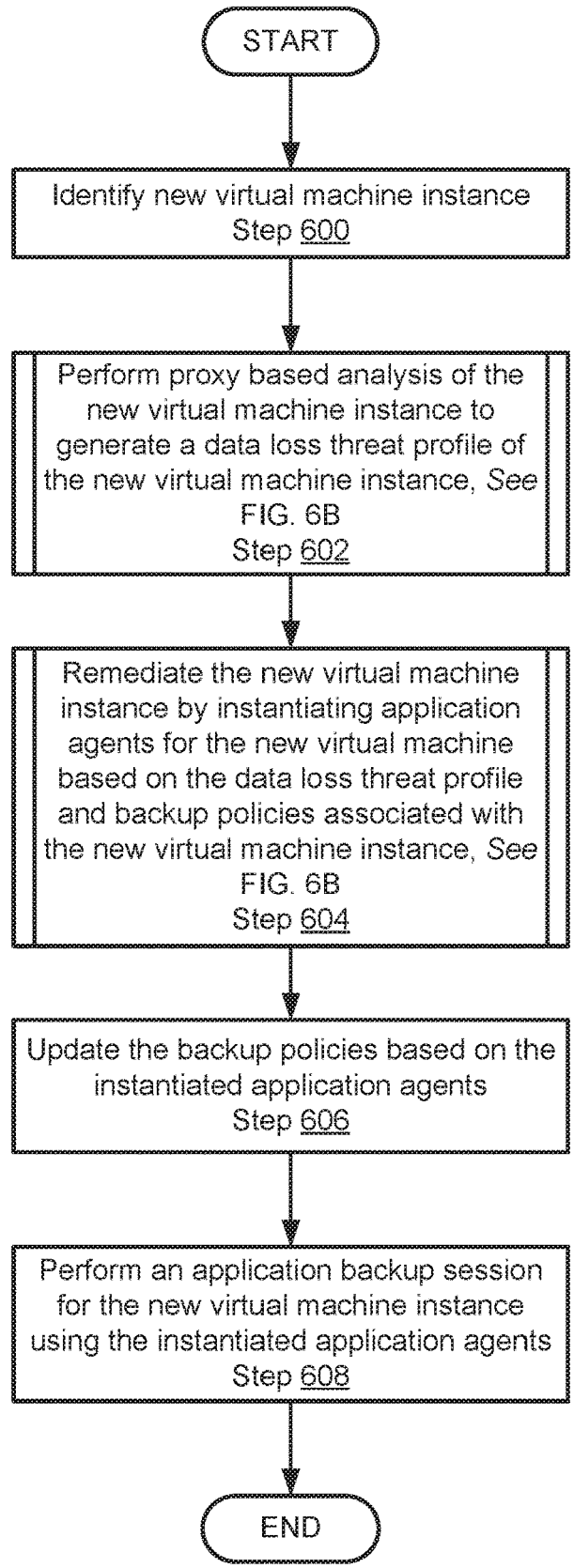
FIG. 6A shows a flowchart of a method of generating a backup in accordance with one or more embodiments of the invention.
Figure 6B:
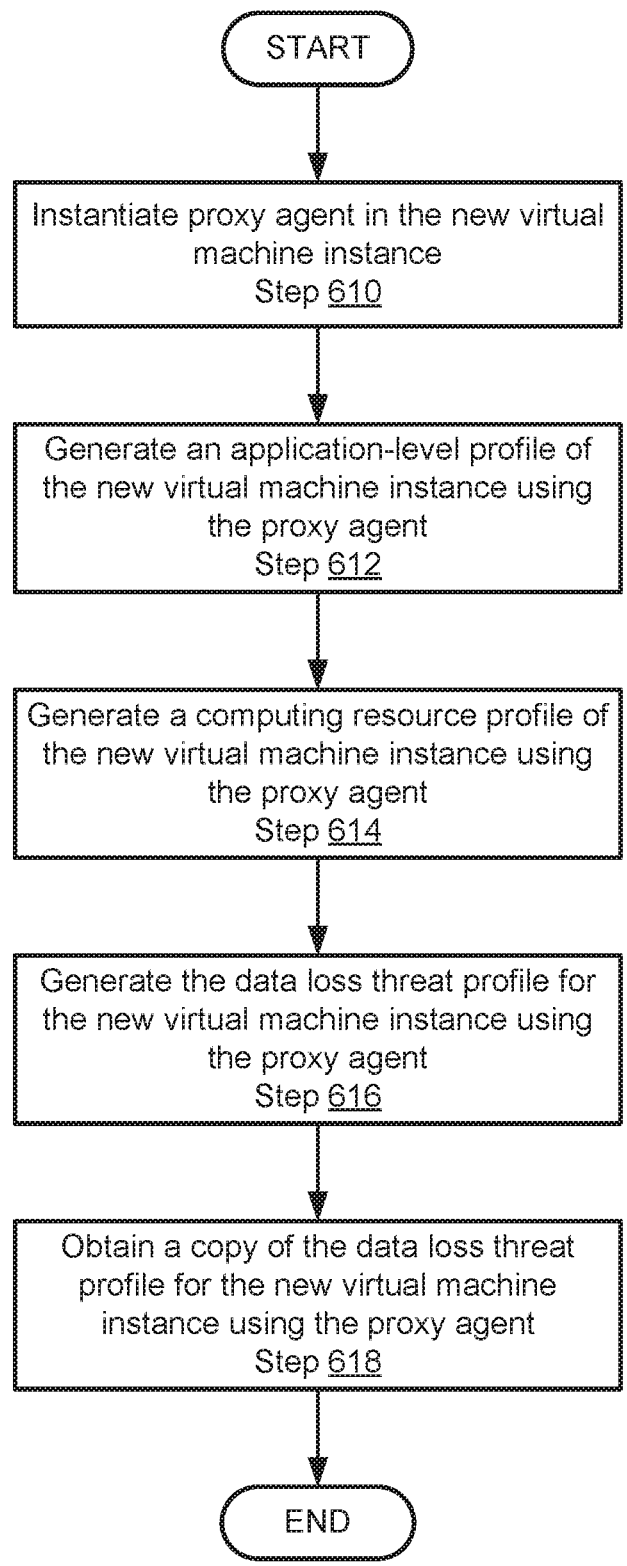
FIG. 6B shows a flowchart of a method of performing a proxy based analysis in accordance with one or more embodiments of the invention.
Figure 6C:
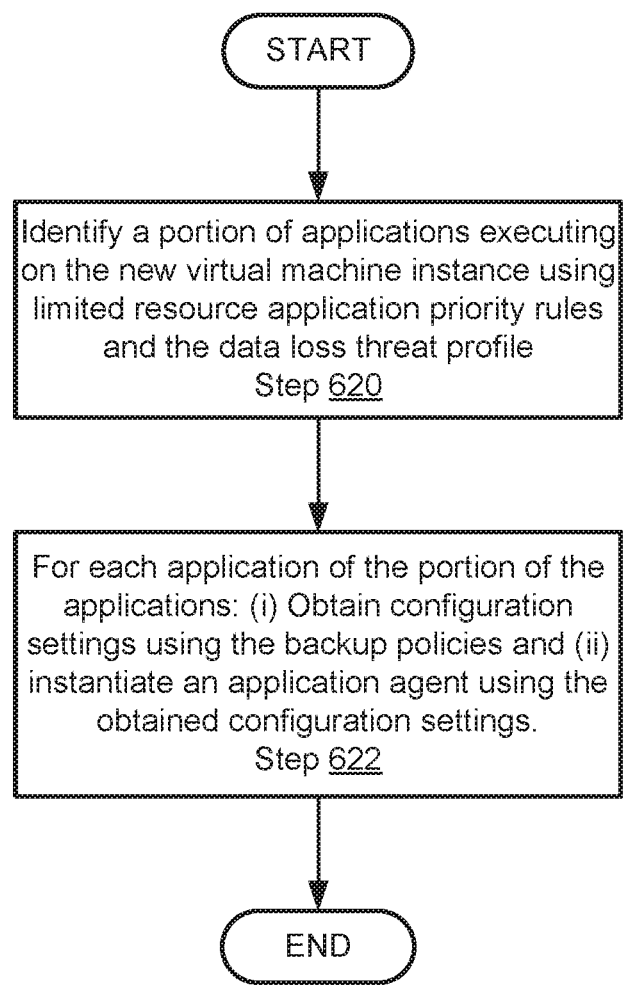
FIG. 6C shows a flowchart of a method of remediating a new virtual machine instance in accordance with one or more embodiments of the invention.

To provide the aforementioned functionality, the production hosts may perform all, or a portion, of the methods illustrated in FIGS. 6A-6C. For additional details regarding the production hosts (130), See FIGS. 2A-2B.

In one or more embodiments of the invention, the remote agents (110) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device cause the computing device to perform the functions of remote agents (110) described in this application and all, or a portion thereof, of the methods illustrated in FIGS. 6A 6C. The remote agents (110) may be other types of computing devices without departing from the invention. For additional details regarding computing devices, See FIG. 8.

In one or more embodiments of the invention, the remote agents (110) are distributed computing devices. As used herein, a distributed computing device refers to functionality provided by a logical device that utilizes the computing resources of one or more separate and/or distinct computing devices. For example, in one or more embodiments of the invention, the remote agents (110) may be distributed devices that include components distributed across a number of separate and/or distinct computing devices. In such a scenario, the functionality of the remote agents (110) may be performed by multiple different computing devices without departing from the invention.

In one or more embodiments of the invention, the remote agents (110) provide services to virtual machines. The services may include storing virtual machine data, generating backups of the virtual machines, and/or performing restorations of virtual machines.

In one or more embodiments of the invention, the remote agents (110) provide the aforementioned services by performing backup or restoration workflows. Performing backup workflows may generate a backup that is usable for restoration purposes. Performing a restoration workflow may restore a virtual machine to a previous state, an application to a previous state, or another entity hosted by the production hosts to a previous state. The steps in the aforementioned workflows may be governed by policies. Each workflow may include any number of steps. Different workflows may include different numbers and different types of steps.

In one or more embodiments of the invention, the remote agents (110) perform a proxy based analysis of production hosts, or hosted entities, before providing services to the production hosts. Performing the proxy based analysis may generate a data loss threat profile of the production hosts. The generated data loss threat profile of each production hosts, or hosted entity, may be used when determining workflows for performing backup/restoration services for the production hosts or hosted entities. By doing so, embodiments of the invention may provide an improved method of performing backups and/or restorations in a distributed computing environment. By basing workflows on consistently generated data loss threat profiles, consistency of backup generation across a distributed system may be ensured. As will be discussed with respect to FIGS. 4-5, because backups may be dependent on other backups for restoration purposes, providing consistently generated backups reducing computing resources directed toward generation of backups that are unusable for desired restoration purposes. For additional details regarding remote agents, See FIG. 3.

In one or more embodiments of the invention, the backup storages (120) are computing devices. The computing devices may be, for example, mobile phones, tablet computers, laptop computers, desktop computers, servers, distributed computing systems, or a cloud resource. The computing devices may include one or more processors, memory (e.g., random access memory), and persistent storage (e.g., disk drives, solid state drives, etc.). The persistent storage may store computer instructions, e.g., computer code, that when executed by the processor(s) of the computing device that cause the computing device to provide the functionality of the backup storages (120) described through this application and all, or a portion, of the methods illustrated in FIG. 6A-6C. For additional details regarding computing devices, See FIG. 8.

In one or more embodiments of the invention, the backup storages (120) are distributed computing devices. As used herein, a distributed computing device refers to functionality provided by a logical device that utilizes the computing resources of one or more separate and/or distinct computing devices. For example, in one or more embodiments of the invention, the backup storages (120) may be distributed devices that include components distributed across a number of separate and/or distinct computing devices. In such a scenario, the functionality of the backup storages (120) may be performed by multiple different computing devices without departing from the invention.

In one or more embodiments of the invention, the backup storages (120) store data from the production hosts (130). The data may be, for example, backups of virtual machines, production hosts, or other entities. In one or more embodiments of the invention, a backup is a data structure that reflects a state of a production host, virtual machine, or other entity at a predetermined point in time or changes to a state over a period of time. For example, a backup of a virtual machine may be an image of the virtual machine or a difference disk of the virtual machine. In another example, a backup of an application may be a log of an application executing on a virtual machine. An image of a virtual machine may include all of the virtual machine data at a point in time. A difference disk may be the changes made to virtual machine data over a period of time. A log may include changes made to application data made over a period of time. The backup of a virtual machine may be other types of data structures that may be used to restore a virtual machine to a previous state without departing from the invention.

Multiple backups of varying types may be used to restore a production host, virtual machine, or other entity to a previous state. These multiple backups may be referred to as a continuity chain. Each backup of the continuity chain may be usable in combination with other members of the continuity chain for restoration purposes. For example, a virtual machine image may be used to restore a virtual machine to a state of the virtual machine at the time the image was generated. In another example, a virtual machine image and a difference disk for a period of time immediately following the point in time associated with the virtual machine image may be used to restore a virtual machine to a state of the virtual machine at the end of the period of time following the point in time, i.e., after the difference disk.

In such a scenario, the virtual machine image and difference disk may form a continuity chain. In one or more embodiments of the invention, a continuity chain is a number of backups that are each associated with different periods of time that form a continuous lineage, e.g., the periods of time associated with the backups cover a continuous portion of a timeline. For example, a first backup may be associated with. May 12 and a second backup may be associated with May 13-May 17. Thus, the combination of the first backup and the second backup cover the period of May 12-May 17. The backups may be used to restore the virtual machine to any point in time between May 12 and May 17. The backup storages (120) may store additional or different data from backups of virtual machines without departing from the invention.

However, as noted above, the backups for a particular entity must form a continuity chain for them to be usable in combination with each other for restoration purposes. If a backup workflow is misconfigured, even if a backup is generated it may still break the continuity chain rendering the generated backup and other backups unusable for restoration purposes. Embodiments of the invention may improve the likelihood that backup workflows generate backups that provide a continuous continuity, chain. Doing so improves the efficiency of generating backups in a distributed environment because, otherwise, continuity chain compliant backups may need to be generated, in addition to the unusable backups, to ensure that restoration services may be provided within the distributed environment of FIG. 1. By improving the efficiency of backup generation, an improved distributed environment may be provided that provides higher computational throughput, increased memory capacity, and/or improved storage capacity due to the improved efficiency of use of the aforementioned resources for backup/restoration purposes.

In one or more embodiments of the invention the backup storages (120) are deduplicated storages. A deduplicated storage may attempt to increase the quantity of data that it can store by only storing copies of unique data. When storing data in a deduplicated storage, the data may first be checked to determine whether it is duplicative of data already stored in the backup storage. Only the unique portions of the data may be stored in the backup storage. Storing and accessing data in a deduplicated storage may be significantly more computing resource costly than storing data in a non-deduplicated storage. Thus, efficient generation of backups and efficient providing of restoration services is of even greater importance in such environment. The backup storages (120) may not be deduplicated without departing from the invention. The system of FIG. 1 may utilize other storages of other computing devices for storing generated backups without departing from the invention.

Figure 2A:
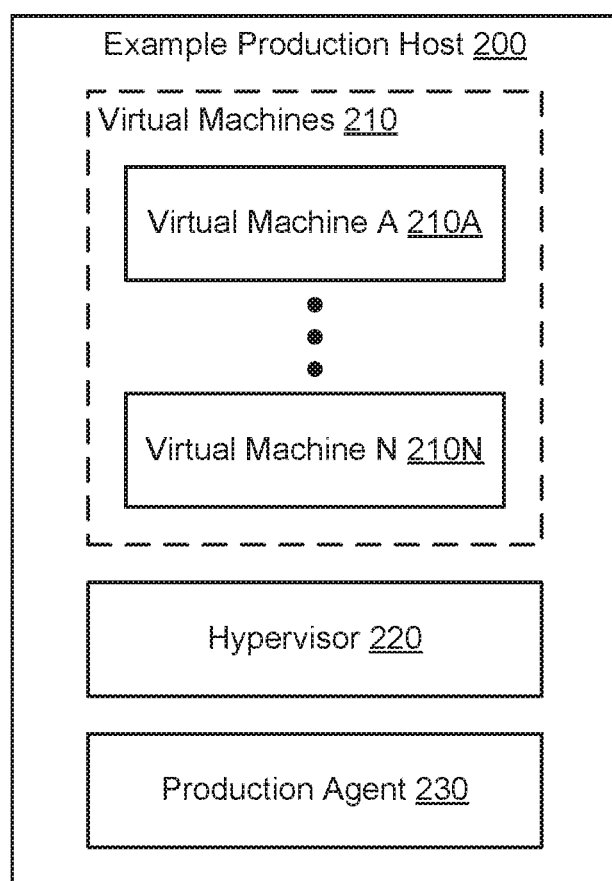
FIG. 2A shows a diagram of an example production host in accordance with one or more embodiments of the invention.

As discussed above, the backup storages may store data obtained from the production hosts (130). FIG. 2A shows a diagram of an example production host (200) in accordance with one or more embodiments of the invention.

In one or more embodiments of the invention, the example production host (200) hosts virtual machines (210). The example production hosts (200) may host any number of virtual machines (210A, 210N) without departing from the invention.

In one or more embodiments of the invention, the virtual machines (210) execute using computing resources of the example production host (200). For example, each of the virtual machines (210) may be allocated a portion of the processing resources, memory resources, and/or storage resources of the example production host (200).

In one or more embodiments of the invention, an image of each of the virtual machines (210) at points in time in the past may be stored, i.e., stored locally on a production host hosting the respective virtual machine. Following the points in time in the past, a differencing disk that stores each of the changes made from the image of each of the virtual machines (210) may be stored. The aforementioned images and differencing disks may be stored locally or in a backup storage. Similar data structures may be stored locally before transfer to backup storage when generating backups of applications or other entities.

In one or more embodiments of the invention, logs associated with applications hosted by the virtual machines (210) may be generated. A log may reflect changes to application data. Logs may be used in combination with virtual machine images and/or differencing disks to restore virtual machines to predetermined states and/or applications to predetermined states.

In one or more embodiments of the invention, generating a backup of a virtual machine includes storing a copy of the image of the virtual machine, a differencing disk, and/or a log of one or more applications hosted by the virtual machine in a backup storage. Thus, when performing a restoration of a virtual machine, the differencing disks and/or logs may be merged with a virtual machine image to obtain a representation of the virtual machine and/or application at the point in time following the periods of time reflected by each of the differencing disks and/or logs. However, to perform a merge, each of the aforementioned backups must form a continuity chain. Thus, the backup workflow used to generate the aforementioned backups may determine whether the backups are useable for restoration purposes. For additional details regarding continuity chains of backups, See FIG. 5. For additional details regarding virtual machines, See FIG. 2B.

In one or more embodiments of the invention, the example production host (200) includes a hypervisor (220) that manages the execution of the virtual machines (210). The hypervisor (220) may instantiate and/or terminate any of the virtual machines (210).

In one or more embodiments of the invention, the hypervisor (220) is a hardware device including circuitry. The hypervisor (220) may be, for example, a digital signal processor, a field programmable gate array, or an application specific integrated circuit. The hypervisor (220) may be other types of hardware devices without departing from the invention.

In one or more embodiments of the invention, the hypervisor (220) is implemented as computing code stored on a persistent storage that when executed by a processor performs the functionality of the hypervisor (220). The processor may be a hardware processor including circuitry such as, for example, a central processing unit or a microcontroller. The processor may be other types of hardware devices for processing digital information without departing from the invention.

The example production host (200) may include a production agent (230) that manages the storage of virtual machine data, e.g., images, difference disks, and logs, in a backup storage. The production agent (230) may issue commands to the hypervisor (220) to control the operation of a virtual machine when attempting to store virtual machine data. For example, the production agent (230) may initiate the processes of generating a backup package, i.e., data that reflects a state of an entity and enables the entity to be restored to the state, for a virtual machine, an application, or other entity executing on the example production host (200). Similarly, the production agent (230) may initiate restorations of virtual machines, applications, or other entities.

In one or more embodiments of the invention, the production agent (230) is a hardened entity, i.e., not modifiable by an entity that is remote to a production host on which the production agent (230) is executing. The production agent (230) may have a set, finite number of predefined functions that may be invoked by a remote entity. In one or more embodiments of the invention, the production agent (230) is not configurable by modifying settings or associated configuration files via a remote terminal or other configuration utility.

In one or more embodiments of the invention, the production agent (230) is a hardware device including circuitry. The production agent (230) may be, for example, digital signal processor, a field programmable gate array, or an application specific integrated circuit. The production agent (230) may be other types of hardware devices without departing from the invention.

In one or more embodiments of the invention, the production agent (230) is implemented as computing code stored on a persistent storage that when executed by a processor performs the functionality of the production agent (230). The processor may be hardware processor including circuitry such as, for example, a central processing unit or a microcontroller. The processor may be other types of hardware devices for processing digital information without departing from the invention.

Figure 2B:
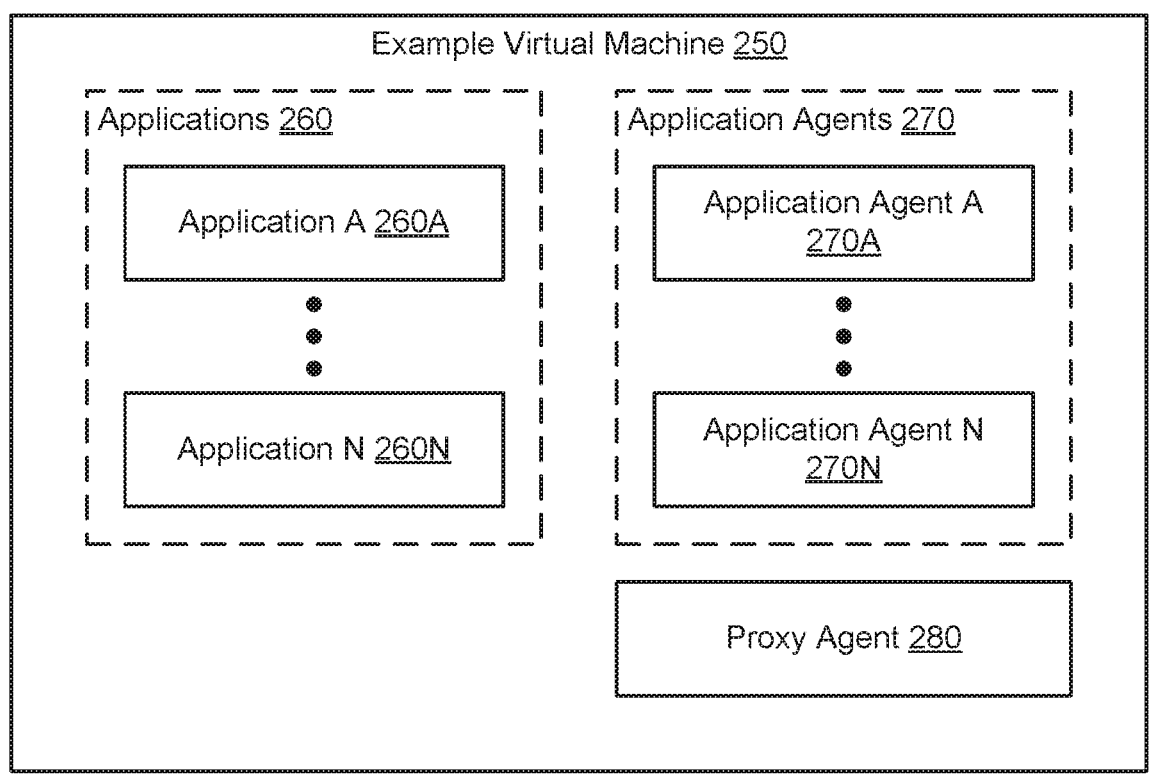
FIG. 2B shows a diagram of an example virtual machine in accordance with one or more embodiments of the invention

FIG. 2B shows a diagram of an example virtual machine (250) in accordance with one or more embodiments of the invention.

In one or more embodiments of the invention, the example virtual machine (250) hosts applications (260), application agents (270), and a proxy agent (280). The applications (260) may be any type of application, e.g., database, email service, audio player, etc.

The application agents (270) may be entities instantiated as part of a backup generated workflow. The application agents (270) may generate backups of corresponding virtual machines. The actions for backup generation performed by the application agents (270) may be determined using data loss threat profiles generated by, the proxy agent (280), as will be discussed below. In other words, the application agents (270) may be configured to perform actions in accordance with backup workflows specified by remote agents. While illustrated as separate entities, the functionality of the application agents (270) may be aggregated into fewer or even a single application agent without departing from the invention. Additionally, while illustrated as being hosted by the virtual machine hosting the applications (260), the application agents may be executing remotely from the virtual machines and/or on other computing devices that do not host the virtual machine without departing from the invention.

The proxy agent (280) may be an entity instantiated prior to the performance of backup generation workflows by remote agents. The proxy agent (280) may be remotely controlled by a corresponding remote agent. The proxy agent (280) may generate a data loss threat profile for the example virtual machine (250).

In one or more embodiments of the invention, a data loss threat profile includes a listing of each type, version, and/or quantity of application data of each application (260). The data loss threat profile may include additional, less, or different information regarding the applications (260) without departing from the invention.

Figure 3:
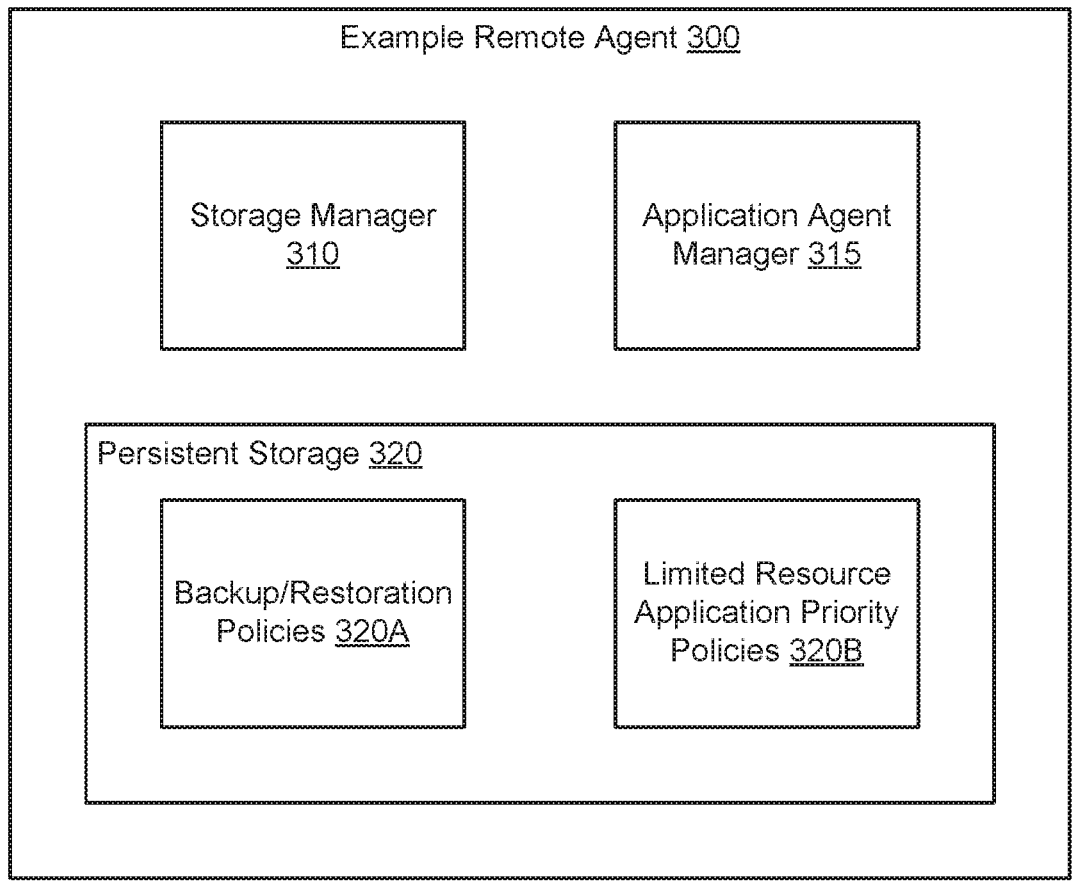
FIG. 3 shows a diagram of an example remote agent in accordance with one or more embodiments of the invention.

When generating a backup or performing a restoration of a virtual machine, a remote agent may store or access data in a backup storage. FIG. 3 shows a diagram of an example remote agent (300) in accordance with one or more embodiments of the invention. The example remote agent (300) may include a storage manager (310), an application agent manager (315), and a persistent storage (320). Each component of the example remote agent (300) is discussed below.

In one or more embodiments of the invention, the storage manager (310) is a hardware device including circuitry. The storage manager (310) may be, for example, digital signal processor, a field programmable gate array, or an application specific integrated circuit. The storage manager (310) may be other types of hardware devices without departing from the invention.

In one or more embodiments of the invention, the storage manager (310) is implemented as computing code stored on a persistent storage that when executed by a processor performs the functionality of the storage manager (310). The processor may be hardware processor including circuitry such as, for example, a central processing unit or a microcontroller. The processor may be other types of hardware devices for processing digital information without departing from the invention.

In one or more embodiments of the invention, the storage manager (310) performs backup and restoration workflows governed by policies stored in the backup/restoration policy repository. In other words, the storage manager (310) may perform a series of steps specified by policies of the backup/restoration policy repository to complete a backup or restoration workflow. The storage manager (310) may perform all, or portion, of the methods illustrated in FIGS. 6A-6C.

In one or more embodiments of the invention, the application agent manager (315) is a hardware device including circuitry. The application agent manager (315) may be, for example, digital signal processor, a field programmable gate array, or an application specific integrated circuit. The application agent manager (315) may be other types of hardware devices without departing from the invention.

In one or more embodiments of the invention, the application agent manager (315) is implemented as computing code stored on a persistent storage that when executed by a processor performs the functionality of the application agent manager (315). The processor may be hardware processor including circuitry such as, for example, a central processing unit or a microcontroller. The processor may be other types of hardware devices for processing digital information without departing from the invention In one or more embodiments of the invention, the application agent manager (315) orchestrates the operation of application agents executing on the production hosts. The application agent manager (315) may instantiate the application agents and/or configure the application agents. Configuring the applications agents may cause the application agents to perform a predetermined workflow for backup generation purposes. In one or more embodiments of the invention, the application agent manager (315) configures the application agents based on a data loss threat profile for a virtual machine hosting the application agents. The application agent manager (315) may configure each of the application agents differently based on corresponding portion of the data loss threat profile associated with each application for which the application agent will perform a backup workflow. The application agent manager (315) may perform all, or portion, of the methods illustrated in FIGS. 6A-6C.

In one or more embodiments of the invention, the persistent storage (320) is a storage device that stores data structures. The persistent storage (320) may be a physical or virtual device. For example, the persistent storage (320) may include solid state drives, solid state drives, tape drives, and other components to provide data storage functionality.

Alternatively, the persistent storage (320) may be a virtual device that utilizes the physical computing resources of other components to provide data storage functionality.

The data structures stored by the persistent storage (320) may include backup/restoration policies (320A) and limited resource application priority polices (320B). Each of the aforementioned data structures is discussed below.

The backup/restoration policies (320A) may specify workflows for backup and/or restoration purposes. The workflows may specify the actions to be performed to generate a backup or restore a virtual machine. In one or more embodiments of the invention, the backup/restoration policies (320A) include policies that specify different workflows associated with different entities. For example, each policy may be associated with a different entity. Each policy may be independent and may be similar to or different from other policies.

In one or more embodiments of the invention, each backup policy specifies a target entity, a workflow, and a target storage location. The target entity may be the entity that will be backed up. The workflow may specify that actions to be performed by the remote agent and/or other entities while performing the backup workflow. The target storage location may be where the generated backup is to be stored. Each of the backup policies may be associated with different entities, different data, or other portions of the production hosts. In some embodiments of the invention, a backup policy may be associated with multiple entities. In such a scenario, the workflow of the backup policy may generate a backup for each of the associated multiple entities.

The aforementioned data structures may be stored in any format, stored with other data, stored in other locations, and/or be stored in a distributed format or shareable format across any number of computing devices without departing from the invention. For example, multiple remote agents may use a shared data structure including the aforementioned data structures.

Figure 4:
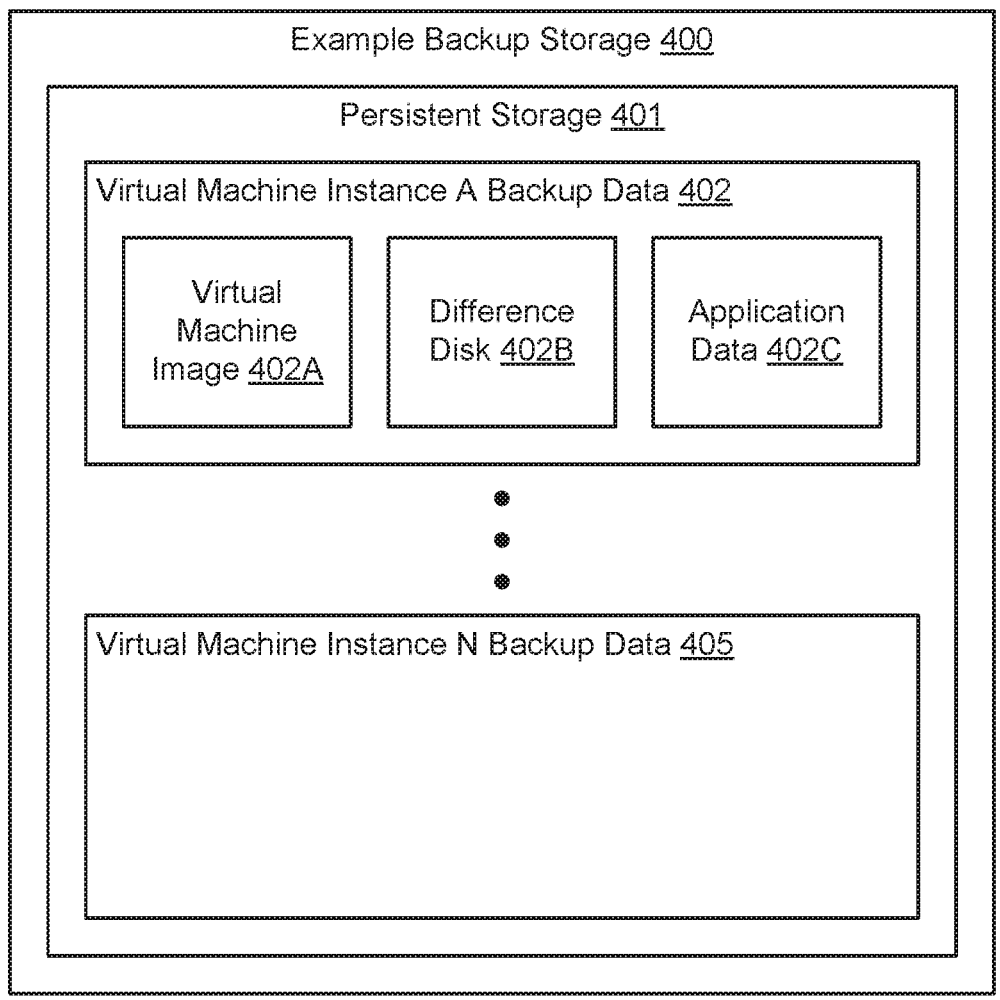
FIG. 4 shows a diagram of an example backup storage in accordance with one or more embodiments of the invention.

When generating a backup and/or performing a restoration, a remote agent may store or access data in a backup storage. FIG. 4 shows a diagram of an example backup storage (400) in accordance with one or more embodiments of the invention. The example backup storage (400) may store backup data associated with any number and type of entity. To provide the aforementioned functionality, the example backup storage (400) may include a persistent storage (401).

In one or more embodiments of the invention, the persistent storage (401) is a storage device that stores data structures. The persistent storage (401) may be a physical or virtual device. For example, the persistent storage (401) may include solid state drives, solid state drives, tape drives, and other components to provide data storage functionality. Alternatively, the persistent storage (401) may be a virtual device that utilizes the physical computing resources of other components to provide data storage functionality.

The data structures stored by the persistent storage (401) may include virtual machine instance backup data (e.g., 402, 405). The persistent storage (401) may include any number of such data structures. Each of the aforementioned data structures may be associated with a virtual machine, or other entities, of the system of FIG. 1.

In one or more embodiments of the invention, each virtual machine instance backup data (e.g., 402) includes one or more backups (e.g., 402A, 402B, 402C). For example, virtual machine instance A backup data (402) includes a virtual machine image (402A), a difference disk (402B), and application data (402C). The backup data (402) may include additional, different, or fewer backups without departing from the invention.

Each of the backups of the virtual machine instance A backup data (402) may be usable for restoration of a corresponding virtual machine instance hosted by a production host. As noted above, for the backup data to be usable for restoration purposes, it must form a continuous continuity chain. In other words, each of the backups must be usable in combination with each other. To ensure that they are usable in combination with each other, embodiments of the invention may utilize the methods illustrated in FIGS. 6A-6C when generating the aforementioned backups.

Figure 5:
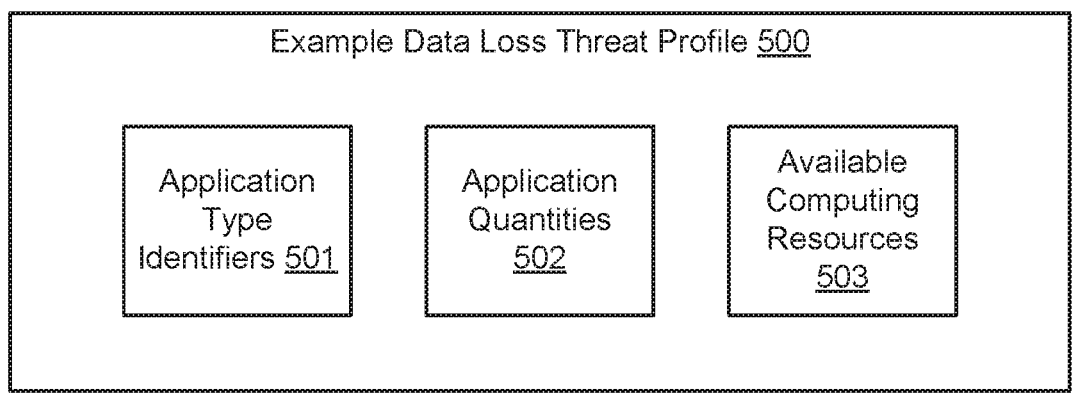
FIG. 5 shows a diagram of an example data loss threat profile in accordance with one or more embodiments of the invention.

To further clarify aspects of embodiments of the invention, a diagram of a data loss threat profile usable by the system of FIG. 1 is illustrated in FIG. 5. The data structure may be used when performing all or a portion of the methods illustrated in FIGS. 6A-6C.

FIG. 5 shows a diagram of an example data loss threat profile (500) in accordance with one or more embodiments of the invention. The example data loss threat profile (500) may include information used for determining workflows for generating backups and/or performing restorations. The example data loss threat profile (500) may be associated with a virtual machine, or other entity of the system of FIG.

In one or more embodiments of the invention, the example data loss threat profile (500) includes application type identifiers (501), application quantities (502), and available computing resources (503). The application type identifiers (501) may be identifiers of applications hosted by a virtual machine. The application quantities (502) may specify the quantity of each application identified by the application type identifiers (501). The available computing resources (503) may specify the quantity of computing resources of the virtual machine hosting the applications identified by the application type identifiers (501). In additional to the aforementioned information, the example data loss threat profile (500) may also specify, for example, the quantity of data associated with each application identified by the application type identifiers (501), the average computing resources consumed by each application identified by the application type identifiers (501), and/or other characteristics of the applications identified by the application type identifiers (501). Each of the aforementioned portion of the example data loss threat profile (500) may be specified on a granular level, e.g., per application, or macro level, e.g., per application type. The example data loss threat profile (500) may include additional, less, and/or different data without departing from the invention. The example data loss threat profile (500) may be stored in any format, combined with other data, stored in different locations, and/or distributed or shared across any number of computing devices without departing from the invention.

As discussed above, components of the system of FIG. 1 may perform methods for managing virtual machines by generating backups, performing restoration, and/or generating clones, in addition to other functions. FIGS. 6A-6C show methods in accordance with one or more embodiments of the invention that may be performed by components of the system of FIG. 1.

FIG. 6A shows a flowchart of a method in accordance with one or more embodiments of the invention. The method depicted in FIG. 6A may be used to provide backup and/or restoration services in accordance with one or more embodiments of the invention. The method shown in FIG. 6A may be performed by, for example, a remote agent (e.g., 110, FIG. Other components of the system illustrated in FIG. 1 may perform all, or a portion, of the method of FIG. 6A without departing from the invention.

In Step 600, a new virtual machine instance is identified.

In one or more embodiments of the invention, the new virtual machine instance is identified via a notification received from a production agent executing on a production host that hosts the new virtual machine instance. The production agent may monitor virtual machines hosts by the production host and notify the remote agent of changes, instantiations, and/or removals of virtual machines.

In Step 602, a proxy based analysis of the new virtual machine instance is performed to generate a data loss threat profile of the new virtual machine instance.

In one or more embodiments of the invention, the proxy based analysis is performed by instantiating a proxy agent in the new virtual machine instance. The proxy agent may generate the data loss threat profile and provide it to the remote agent.

In one or more embodiments of the invention, the proxy based analysis is performed via the method illustrated in FIG. 6B. The proxy based analysis may be performed via other methods without departing from the invention.

In Step 604, the new virtual machine instance is remediated by instantiating application agents for the new virtual machine based on the data loss threat profile and backup policies associated with the new virtual machine instance.

In one or more embodiments of the invention, the application agents are instantiated based on a type of each application specified by the data loss threat profile. For example, each application agent may be instantiated and configured to perform different workflows corresponding to applications to which they are associated. By doing so, each virtual machine hosted by a production host of the system of FIG. 1 may be subject to backup generation workflow that is performed in the same manner, e.g., same steps. In this manner, embodiments of the invention may ensure consistency of backups generated across the system of FIG. 1.

In one or more embodiments of the invention, the new virtual machine instance is remediated via the method illustrated in FIG. 6C. Other methods of remediating the new virtual machine instance may be used without departing from the invention.

In Step 606, the backup policies are updated based on the instantiated application agents.

In one or more embodiments of the invention, at least one of the backup policies is updated via the update of the backup policies. In one or more embodiments of the invention, the at least one backup policy is updated to indicate that an application associated with instantiated application agents is a target of the at least backup policy. Any number of the backup policies may be updated to indicate the new targets of the backup policies without departing from the invention. By doing so, embodiments of the invention may provide an automated method of ensuring that backups are generated in a timely manner that is consistent across the system of FIG. 1.

In Step 608, an application backup session is performed for the new virtual machine instance using the instantiated application agents.

In one or more embodiments of the invention, the application backup session is performed by sending instructions to each of the instantiated application agents to generate backups. By doing so, backups of the application of each application corresponding to the application agents may be generated locally on the production hosts. Once generated, the backups may be transferred to backup storage in accordance with policies of the backup/restoration policies (e.g., FIG. 3).

The method may end following Step 608.

The method of FIG. 6A may be performed any number of times and at any time. Thus, multiple, successively instantiated new virtual machine instance may trigger the performance of the method of FIG. 6A any number of times. While FIG. 6A is illustrated as a number of steps, the steps of FIG. 6A may be performed in a different order, steps may be omitted, and/or any number of steps may be performed simultaneously or in a partially overlapping manner without departing from the invention. Further, any number of performance of the method of FIG. 6A may be performed in simultaneously or in a partially overlapping fashion. For example, multiple threads, e.g., a process consuming computing resources, may be instantiated on one or more remote agents so that each thread may perform all or portion of the method of FIG. 6A.

FIG. 6B shows a flowchart of a method in accordance with one or more embodiments of the invention. The method depicted in FIG. 6B may be used to perform a proxy based analysis in accordance with one or more embodiments of the invention. The method shown in FIG. 6B may be performed by, for example, a remote agent (e.g., 110, FIG. 1). Other components of the system illustrated in FIG. 1 may perform all, or a portion, of the method of FIG. 6B without departing from the invention.

In Step 610, a proxy agent is instantiated in the new virtual machine instance.

In one or more embodiments of the invention, the new proxy agent is instantiated by sending an instantiation request to a production agent executing on a production host hosting the new virtual machine instance. The production agent may instantiate the proxy agent via a hypervisor of the production host.

In Step 612, an application-level profile of the new virtual machine instance is generated using the proxy agent. The application-level profile may include a type of each application hosted by the new virtual machine instance, the number of each type of each application, and/or the quantity of application data associated with each application.

In Step 614, a computing resource profile of the new virtual machine instance is generated using the proxy agent. In one or more embodiments of the invention, the computing resource profile is generated by identifying a quantity of available processing, memory, and/or storage resources. The identified resources may be added to the profile. Additional, fewer, and/or different resources may be added to the profile without departing from the invention. In one or more embodiments of the invention, the computing resource profile specifies each of the resources over a future period of time, e.g., predicted availabilities. The predictions may be based on historical usage data or other metrics.

In Step 616, the data loss threat profile is generated for the new virtual machine instance using the proxy agent.

In one or more embodiments of the invention, the data loss threat profile is generated by aggregating the application-level profile and the computing resource profile.

In Step 618, a copy of the data loss threat profile is obtained for the new virtual machine instance using the proxy agent.

In one or more embodiments of the invention, the copy is obtained by sending a request to the production agent, or another entity executing on the production host. The copy may be automatically sent to the remote agent after it is generated without departing from the invention.

The method may end following Step 618.

FIG. 6C shows a flowchart of a method in accordance with one or more embodiments of the invention. The method depicted in FIG. 6C may be used to remediate a new virtual machine instance in accordance with one or more embodiments of the invention. The method shown in FIG. 6C may be performed by, for example, a remote agent (e.g., 110, FIG. 1). Other components of the system illustrated in FIG. 1 may perform all, or a portion, of the method of FIG. 6C without departing from the invention.

In Step 620, a portion of applications executing on the new virtual machine instance is identified using limited resource application priority policies.

In one or more embodiments of the invention, the portion is identified by identifying an order of all of the applications using the limited resource application priority policies. The data loss threat profile is then used to identify the portion. More specifically, the available computing resources and the quantity of data may be used to make a prediction of how many of the applications may be serviced within a period of time specified by a backup generation workflow. The portion of the application may include only those applications for which the prediction indicates that backups will be generated within the period of time specified by the backup generation workflow. The backup generation workflow may be specified by a backup policy.

In Step 622, for each application of the portion of the applications configuration settings for application agents are obtained from the backup policy and corresponding application agents are instantiated using the obtained configuration settings.

In one or more embodiments of the invention, instantiating the application agents using the obtained configuration settings ensures that the backup generation workflow meets the backup policy.

The method may end following Step 622.

To further clarify embodiments of the invention, an example is provided in FIGS. 7A-7D. The example is non-limiting.

EXAMPLE

Figure 7A:
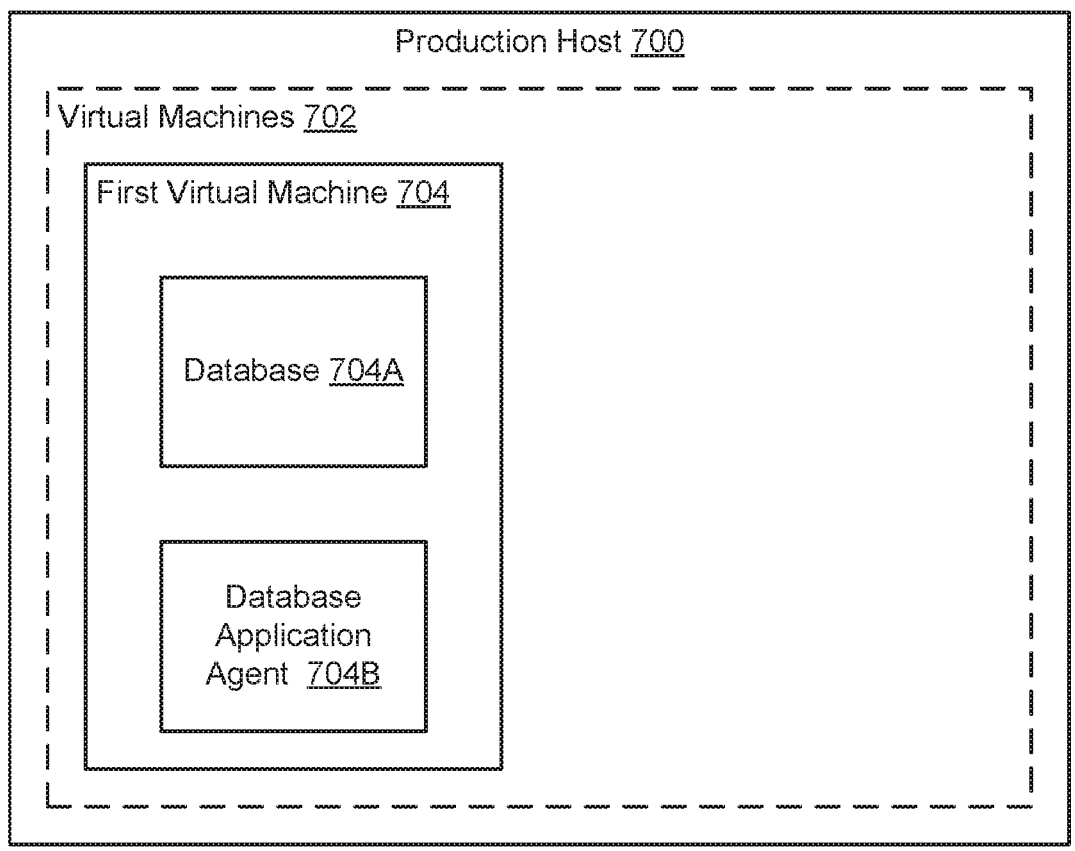
FIG. 7A shows a diagram of an example production host at a first point in time.

Consider a scenario in which at a first point in time a production host (700) illustrated in FIG. 7A hosts a single virtual machine (704) that hosts a database (704A). In accordance with the methods illustrated in FIGS. 6A-6C, a remote agent instantiated a database application agent (704B) to ensure that backups of the database (704A) are generated. By doing so, the database (704A) may be restored to previous points in time.

Figure 7B:
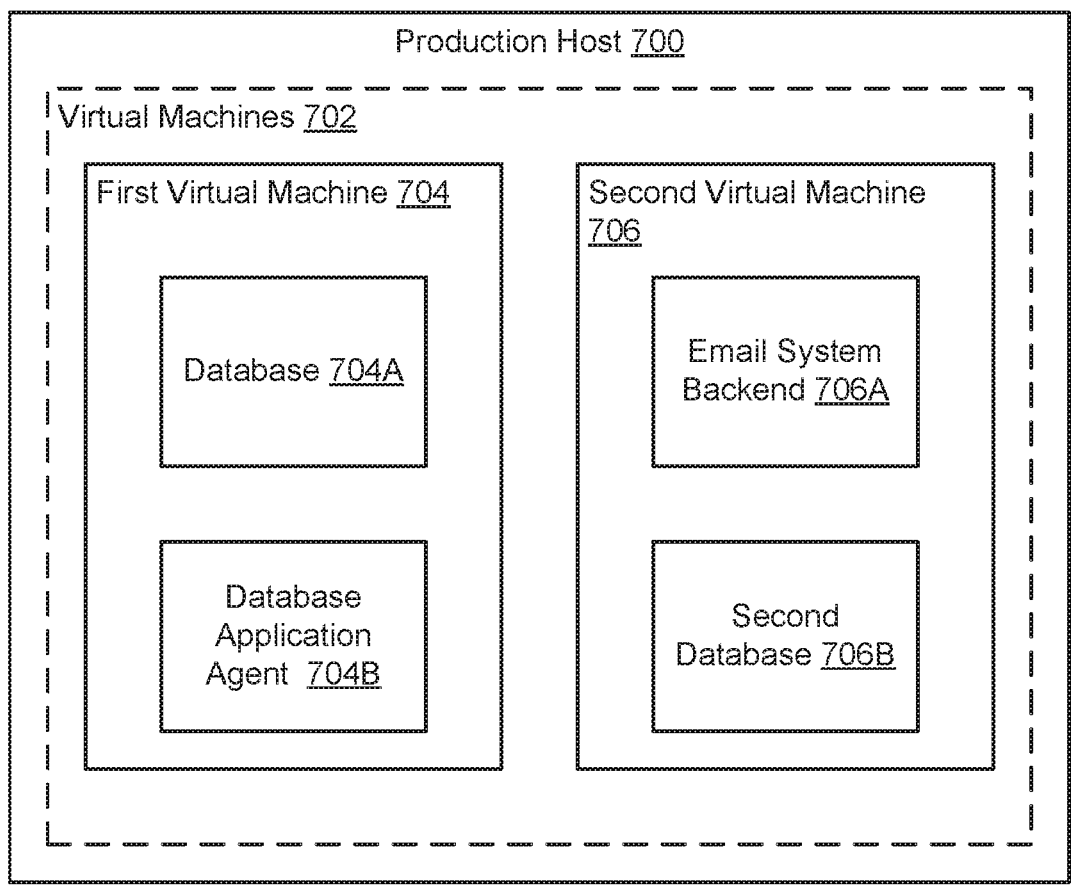
FIG. 7B shows a diagram of the example production host at a second point in time.

At a second point in time illustrated in FIG. 7B, a second virtual machine (706) is instantiated. The second virtual machine (706) hosts an email system backend (706A) and a second database (706B).

Figure 7C:
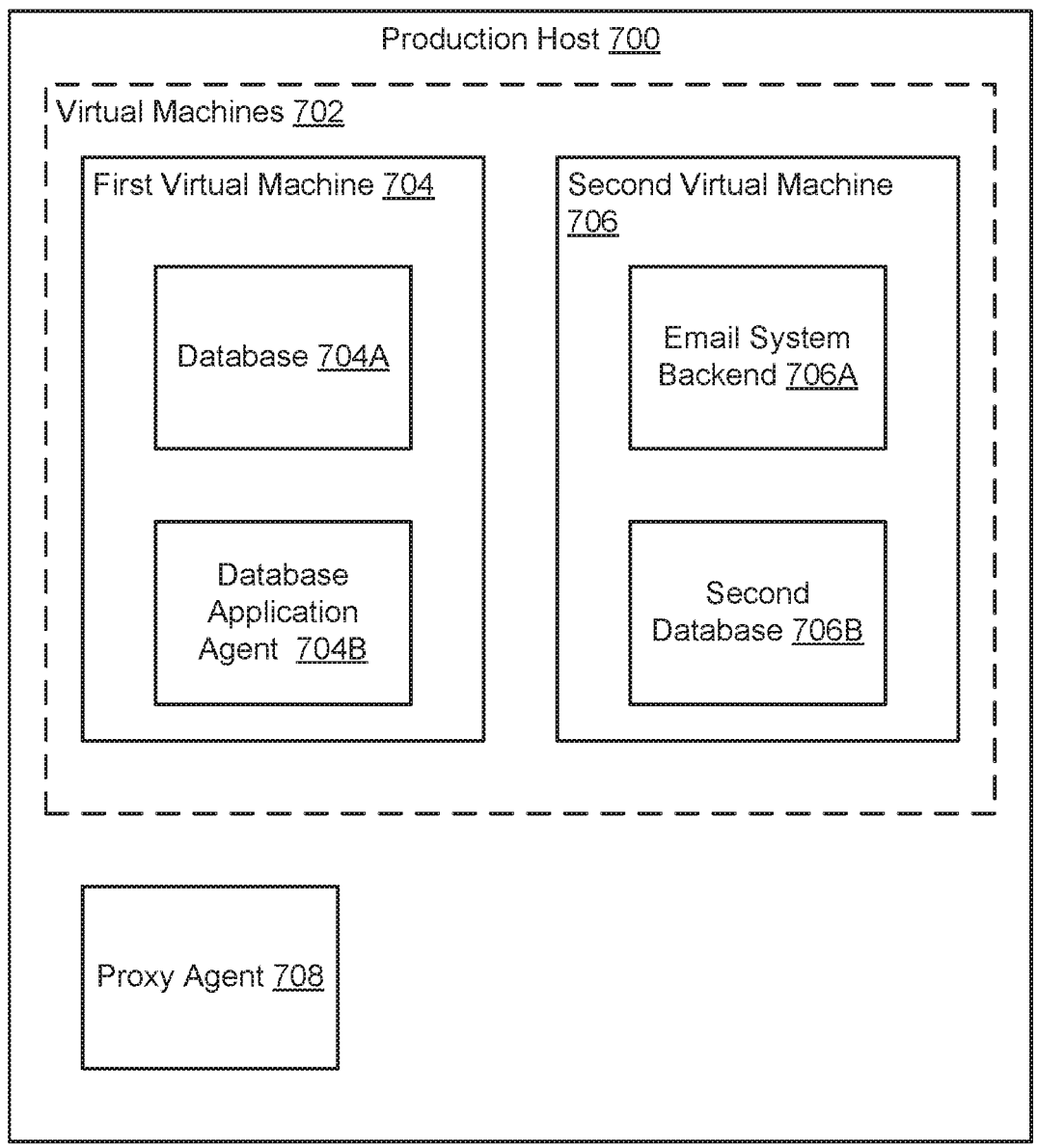
FIG. 7C shows a diagram of the example production host at a third point in time.

In response to the instantiation, the remote agent (not shown) performs the methods of FIGS. 6A-6C by instantiating a proxy agent (708) as seen in FIG. 7C, The proxy agent (708) performs a proxy analysis of the second virtual machine (706) and generates a data loss threat profile associated with the second virtual machine (706). The data loss threat profile indicates that two applications are present and that the second virtual machine (706) does not have sufficient available computing resources to host application agents for all of its executing applications, Using the data loss threat profile, the remote agent (not shown) instantiates application agents as shown in FIG. 7D.

Figure 7D:
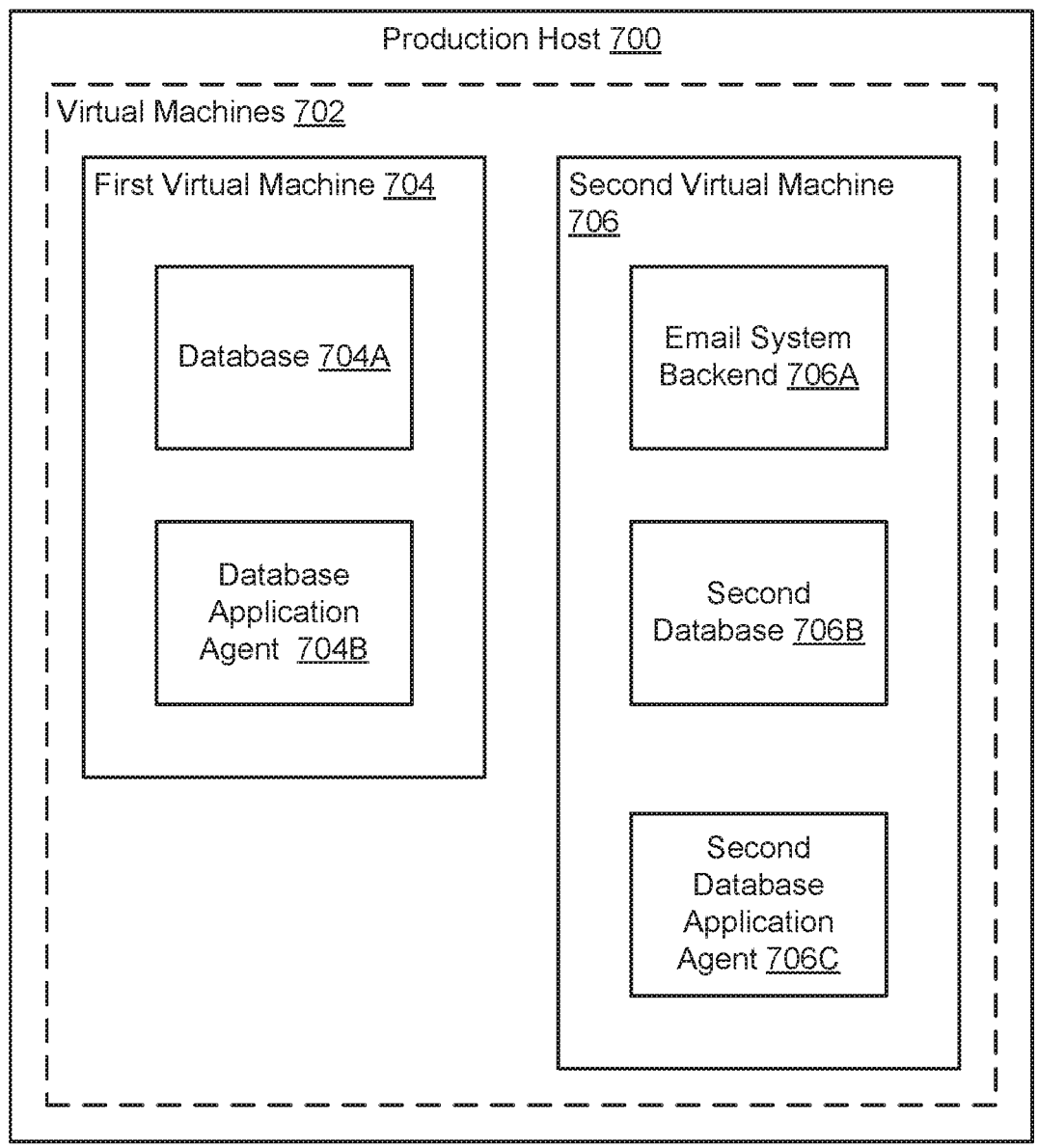
FIG. 7D shows a diagram of the example production host at a fourth point in time.

As seen in FIG. 7D, only a second database application agent (706C) was generated. An application agent was not generated for the email system backend (706A). Only the second database application agent (706C) was generated because of the limited computing resources of the second virtual machine (706).

Thus, in the example of FIGS. 7A-7D, the system prioritized backup generation based on priorities of applications in a low resource availability scenario. Additionally, because both database application agents (704B, 706C) were generated via a single, remote agent, both have identical configuration settings that ensure consistently generated backups are generated across the virtual machines hosted by the production host (700). The results would be similar across multiple production hosts of a distributed system.

END OF EXAMPLE

Figure 8:
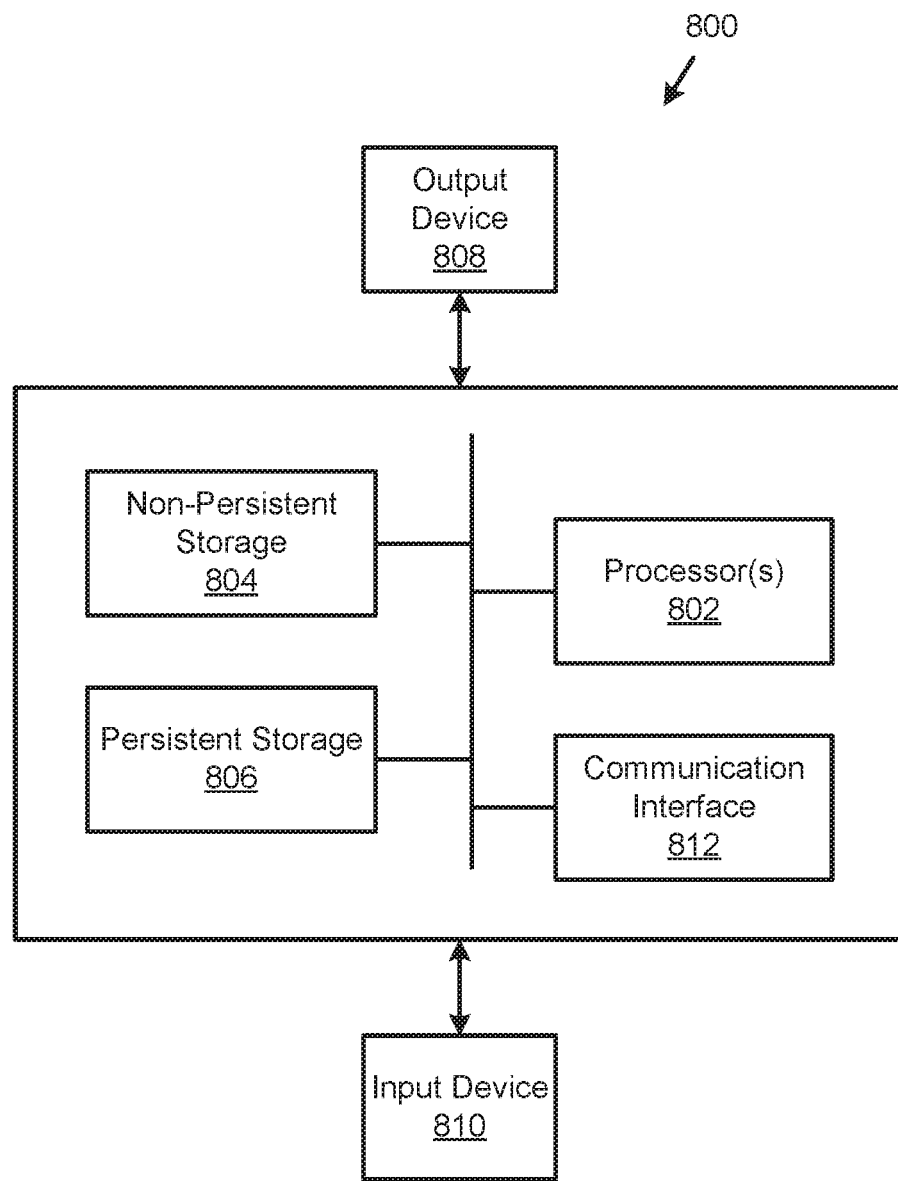
FIG. 8 shows a diagram of a computing device in accordance with one or more embodiments of the invention.

As discussed above, embodiments of the invention may be implemented using computing devices. FIG. 8 shows a diagram of a computing device in accordance with one or more embodiments of the invention. The computing device (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), input devices (810), output devices (808), and numerous other elements (not shown) and functionalities. Each of these components is described below.

In one embodiment of the invention, the computer processor(s) (802) may be an integrated circuit for processing instructions. For example, the computer processor(s) may be one or more cores or micro-cores of a processor. The computing device (800) may also include one or more input devices (810), such as a touchscreen, keyboard, mouse, microphone, touchpad, electronic pen, or any other type of input device. Further, the communication interface (812) may include an integrated circuit for connecting the computing device (800) to a network (not shown) (e.g., a local area network (LAN), a wide area network (WAN) such as the Internet, mobile network, or any other type of network) and/or to another device, such as another computing device.

In one embodiment of the invention, the computing device (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing devices exist, and the aforementioned input and output device(s) may take other forms.

One or more embodiments of the invention may provide an improved process of generating and storing backup data in a distributed computing environment. One or more embodiments of the invention may provide a system that ensures consistency of generated backups across a distributed environment. Embodiments of the invention may accomplish this goal by ensuring that application agents executing on each production host of the system are configured similarly for similar applications.

Additionally, embodiments of the invention may address the problem of generating backups in a limited computing resource environment. As noted above, one or more embodiments of the invention may automatically characterize the available computing resources of production agents within a distributed environment and ensure that each production host does not become overloaded. By doing so, embodiments of the invention may provide an improved user experience of the distributed system by ensuring that phantom slowdowns due to overconsumption of computing resources do not occur.

Further, embodiments of the invention may improve data integrity within a distributed system. As noted above, multiple backups may only be used on combination when they are all members of a continuity chain. By automatically instantiating and configuring agents within the system, backups may be consistently generated and thereby ensures the continuity of continuity chains. Currently methods of configuring the generation of backups within a distributed system are fraught with user error and rely on an unreasonable cognitive burden on users of the system. For example, in modern distributed systems thousands of virtual machines each hosting dozens of applications may be present. Further compounding the problem is the rapidly changing role of virtual machines in distributed environment necessitating the dynamic changing of backup policies. In contrast to prior system, one or more embodiments of the invention provide an automated, data driven system that ensures continuity of generated backups within continuity chains.

The problems discussed above should be understood as being examples of problems solved by embodiments of the invention disclosed herein and the invention should not be limited to solving the same/similar problems. The disclosed invention is broadly applicable to address a range of problems beyond those discussed herein.

One or more embodiments of the invention may be implemented using instructions executed by one or more processors of the data management device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as disclosed herein. Accordingly, the scope of the invention should be limited only by the attached claims.

What is claimed is:

1. An agent for managing virtual machines executing on production hosts, comprising:
    a persistent storage that stores backup policies; and
    a computer processor programmed to:
        receive a notification from a production agent executing on a production host of the production hosts that a new virtual machine instance has been instantiated on the production host, wherein the production agent is external to the new virtual machine instance, wherein the agent is operatively connected to the production host over a network;
        in response to determining that the new virtual machine instance has been instantiated on the production host:
            perform proxy agent based analysis of the new virtual machine instance to generate a data loss threat profile of the new virtual machine instance, wherein performing the proxy agent based analysis comprises sending an instantiation request to the production agent, wherein the production agent initiates the instantiation of a proxy agent in the new virtual machine instance in response to the instantiation request;
            remediate the new virtual machine instance by initiating the instantiation of application agents for the new virtual machine instance based on the data loss threat profile and a portion of the backup policies associated with the new virtual machine instance wherein the application agents execute in the new virtual machine instance;
            update at least one of the backup policies based on the instantiated application agents; and
            perform an application backup session for the new virtual machine instance using the instantiated application agents.

2. The agent of claim 1, wherein application backups associated with respective applications executing on the new virtual machine instance are generated during the application backup session.

3. The agent of claim 2, wherein a differencing disk backup is not generated during the application backup session.

4. The agent of claim 2, wherein a virtual machine image backup is not generated during the application backup session.

5. The agent of claim 1, wherein performing the proxy agent based analysis of the new virtual machine instance to generate the data loss threat profile of the new virtual machine instance further comprises:
    generating an application-level profile of the new virtual machine instance using the proxy agent;
    generating a computing resource profile of the new virtual machine instance using the proxy agent; and
    obtaining a copy of the data loss threat profile for the new virtual machine instance using the proxy agent.

6. The agent of claim 5, wherein performing the proxy agent based analysis of the new virtual machine instance to generate the data loss threat profile of the new virtual machine instance further comprises:
    generating the data loss threat profile using the proxy agent based on the application-level profile and the computing resource profile, wherein the data loss threat profile is generated in the new virtual machine instance.

7. The agent of claim 5, wherein the proxy agent, after being instantiated, executes using computing resources of the new virtual machine instance.

8. The agent of claim 5, wherein the data loss threat profile comprises:
    a list of applications executing on the new virtual machine instance;
    a type of each application of the list of applications; and
    a listing of availability of computing resources of the new virtual machine instance.

9. The agent of claim 1, wherein remediating the new virtual machine instance by instantiating application agents for the new virtual machine instance based on the data loss threat profile and the portion of the backup policies associated with the new virtual machine instance comprises:
    identifying a portion of applications executing on the new virtual machine instance using limited resource application priority rules and the data loss threat profile; and
    for each application of the portion of the applications:
        obtaining configuration settings associated with each respective application using the backup policies, and instantiating an application agent using the obtained configuration settings associated with the respective application.

10. The agent of claim 1, wherein the backup policies specify:

workflows for generating backups of the virtual machines.

11. The agent of claim 10, wherein a first portion of the workflows specify storage of a virtual machine image in a backup storage.

12. The agent of claim 11, wherein a second portion of the workflows specify storage of a difference disk in the backup storage.

13. The agent of claim 12, wherein a third portion of the workflows specify storage of an application log in the backup storage.

14. The agent of claim 13, wherein the backup storage is separate from the agent.

15. The agent of claim 1, wherein the portion of the backup policies associated with the new virtual machine instance specify workflows for generating an application log backup.

16. A method for managing virtual machines by an agent, comprising:

receiving a notification from a production agent executing on a production host that a new virtual machine instance has been instantiated on the production host, wherein the production agent is external to the new virtual machine instance, wherein the agent is operatively connected to the production host over a network;

in response to determining that the new virtual machine instance has been instantiated on the production host:

performing proxy agent based analysis of the new virtual machine instance to generate a data loss threat profile of the new virtual machine instance, wherein performing the proxy agent based analysis comprises sending an instantiation request to the production agent, wherein the production agent initiates the instantiation of a proxy agent in the new virtual machine instance in response to the instantiation request;

remediating the new virtual machine instance by initiating the instantiation of application agents for the new virtual machine instance based on the data loss threat profile and a portion of backup policies associated with the new virtual machine instance, wherein the backup policies are associated with the virtual machines, wherein the application agents execute in the new virtual machine instance;

updating at least one of the backup policies based on the instantiated application agents; and performing an application backup session for the new virtual machine instance using the instantiated application agents.

17. The method of claim 16, wherein the portion of the backup policies associated with the new virtual machine instance each specify a workflow for generating an application log backup.

18. A non-transitory computer readable medium comprising computer readable program code, which when executed by a computer processor enables the computer processor to perform a method for managing virtual machines by an agent, the method comprising:

receiving a notification from a production agent executing on a production host that a new virtual machine instance has been instantiated on the production host, wherein the production agent is external to the new virtual machine instance, wherein the agent is operatively connected to the production host over a network;

in response to determining that the new virtual machine instance has been instantiated on the production host:

performing proxy agent based analysis of the new virtual machine instance to generate a data loss threat profile of the new virtual machine instance wherein performing the proxy agent based analysis comprises sending an instantiation request to the production agent, wherein the production agent initiates the instantiation of a proxy agent in the new virtual machine instance in response to the instantiation request;

remediating the new virtual machine instance by initiating the instantiation of application agents for the new virtual machine instance based on the data loss threat profile and a portion of backup policies associated with the new virtual machine instance, wherein the backup policies are associated with the virtual machines, wherein the application agents execute in the new virtual machine instance;

updating at least one of the backup policies based on the instantiated application agents; and performing an application backup session for the new virtual machine instance using the instantiated application agents.

19. The non-transitory computer readable medium of claim 18, wherein the portion of the backup policies associated with the new virtual machine instance each specify a workflow for generating an application log backup.

* * * * *